United States Patent
Kim et al.

(10) Patent No.: US 7,236,898 B2
(45) Date of Patent: Jun. 26, 2007

(54) SYSTEM AND METHOD FOR CALCULATING REAL-TIME VOLTAGE STABILITY RISK INDEX IN POWER SYSTEM USING TIME SERIES DATA

(75) Inventors: Dong Joon Kim, Changwon-si (KR); Young Hwan Moon, Anyang-si (KR); Ho Yong Kim, Changwon-si (KR); Jae Young Yoon, Changwon-si (KR)

(73) Assignee: Korea Electrotechnology Research Institute, Gyeongsangnam-do (KR)

( * ) Notice: Subject to any disclaimer, the term of this patent is extended or adjusted under 35 U.S.C. 154(b) by 43 days.

(21) Appl. No.: 11/113,048

(22) Filed: Apr. 25, 2005

(65) Prior Publication Data

US 2005/0256922 A1    Nov. 17, 2005

(30) Foreign Application Priority Data

May 11, 2004    (KR) ...................... 10-2004-0032878

(51) Int. Cl.
 G01R 19/00    (2006.01)
 G01R 25/00    (2006.01)
(52) U.S. Cl. ......................................... 702/65; 702/64
(58) Field of Classification Search ............ 702/59–62, 702/64, 65, 182–185
 See application file for complete search history.

(56) References Cited

U.S. PATENT DOCUMENTS 5,181,026 A * 1/1993 Granville ............... 340/870.28
6,690,175 B2 * 2/2004 Pinzon et al. ................ 324/525
6,754,597 B2 * 6/2004 Bertsch et al. ................. 702/57
2002/0123849 A1 * 9/2002 Quaintance et al. .......... 702/60
2003/0040846 A1   2/2003 Rehtanz et al. ............. 700/292
2003/0057924 A1   3/2003 Shimomura et al. .......... 322/28

FOREIGN PATENT DOCUMENTS

JP    2001-025168    *   1/2001
KR    10-0397377         9/2003

OTHER PUBLICATIONS

English Language Abstract of KR 1020020032662.

* cited by examiner

*Primary Examiner*—Michael Nghiem
(74) *Attorney, Agent, or Firm*—Greenblum & Bernstein, P.L.C.

(57) ABSTRACT

A system and method are provided to calculate a real time voltage stability risk index in a power system. The method includes calculating an RMS voltage by using bus voltage measured and calculating an N moving average voltage for the RMS voltages. A percentage diversity between the bus voltage measured and the N moving average voltages is calculated. A voltage stability in that risk index is calculated by dividing the area constructed by the percent diversity by the number of sections. The voltage stability risk index is transferred from a real time phasor measurement device to an upper voltage stability monitoring system. The transferred voltage stability risk indexes are acquired and sequenced and the sequence voltage stability risk indexes are output.

11 Claims, 8 Drawing Sheets

SYSTEM AND METHOD FOR CALCULATING REAL-TIME VOLTAGE STABILITY RISK INDEX IN POWER SYSTEM USING TIME SERIES DATA

BACKGROUND OF THE INVENTION

1. Field of the Invention

The present invention relates to a system and a method for calculating a voltage stability risk index in power system and, more particularly, to a system and a method for promptly monitoring transient voltage stability in real time using voltages measured.

2. Background of the Related Art

In operating a power system, an electric power company controls voltage through two methods. First, the voltage, which is measured and transferred from each main bus, is shown on a display board and the electric power company passively controls the voltage so that the displayed voltage is maintained at a value ranging from 95% to 105% of a rated voltage. Such a method is very simple and effective in controlling voltage for a normal condition, but not helpful for a condition requiring urgent control, for example, when a fault or contingency in the system has occurred due to a disturbance. Moreover, this method cannot provide the information about the sensitivity of a bus voltage.

Second method is to control voltage by analyzing bus voltage sensitivity and calculating a voltage collapse point at a normal state using a power flow calculation method. To apply the power flow calculation, all the data related to a power system have to be inputted: a) impedance data of a power transmission network can be prepared in advance, or may be changed according to the topology of the power transmission network, b) the data on electric power amount and load amount, on the other hand, have to be directly measured and transferred so as to reflect the continuously changing condition of a system. However, it is impossible to measure the electric power amount and load amount for the whole buses in a power system comprising hundreds or thousands of buses. Thus, the voltage, the electric power amount, and the load amount on only some main buses are measured and the data on the rest buses unmeasured are estimated based on the measured electric power amount and load amount. The data comprising the data already prepared, the data measured, and the data estimated, are inputted into a power flow calculation program. The calculation period is more than ten minutes.

One of the voltage stability analyses based on a power flow calculation is a sensitivity analysis on a bus voltage, which calculates a sensitivity representing a minute change of voltage (V) to a minute change of reactive power (Q). If the V–Q sensitivity is positive, it means that voltage stability is stable. The smaller the V–Q sensitivity is, the more robust the bus voltage is. If the voltage stability is reduced, the V–Q sensitivity increases and has an infinite value at a voltage collapse point. Negative V–Q sensitivity means unstable in terms of the voltage stability. Another voltage stability analysis is to calculate a voltage collapse point. The voltage collapse point is a maximum power transmission point at which a power system transmission network can normally transfer, and a point at which the voltage is collapsed. The difference between a voltage collapse point measured and a system operation point may be used as a voltage stability margin. The voltage collapse point is simulated by assuming a scenario because the data on load amounts and electric power amounts cannot be obtained in advance.

However, voltage control methods using such conventional voltage stability analyses cannot completely monitor the voltage in an electric power system and fully reflect voltage characteristics of the whole power system because they uses partial data measured only for main buses. In addition, voltage control methods using such conventional voltage stability analyses cannot achieve a real time voltage monitoring in a power system and cannot represent the soundness of bus voltage at a transient condition.

SUMMARY OF THE INVENTION

Accordingly, the present invention is directed to a system and a method for calculating a real time voltage stability risk index in a power system that substantially obviates one or more problems due to limitations and disadvantages of the related art.

An object of the present invention is to provide a system for calculating a real time voltage stability risk index in a power system using time series data.

Another object of the present invention is to provide a method for calculating a real time voltage stability risk index in a power system using time series data.

To achieve these objects and other advantages and in accordance with the purpose of the invention, as embodied and broadly described herein, the present invention provides a system for calculating a real time voltage stability risk index in a power system, comprising a real time phasor measurement device for measuring voltage from a power system, calculating RMS voltage using the voltage measured, calculating and transferring a voltage stability risk index using the RMS voltage; and an upper voltage stability monitoring system for collecting and sequencing the voltage stability risk index transferred from the real time phasor measurement device.

Further, the present invention provides a method for calculating a real time voltage stability risk index in a power system, comprising calculating and storing RMS voltage by using bus voltage measured; calculating an N moving average voltage for the RMS voltages; calculating a % diversity between the bus voltage measured and the N moving average voltage; calculating a voltage stability risk index by dividing the area constructed by the % diversity by the number of sections; transferring the voltage stability risk index from a real time phasor measurement device to an upper voltage stability monitoring system through Internet or a communication equipment; acquiring the voltage stability risk indexes transferred from the real time phasor measurement device; and sequencing the acquired voltage stability risk indexes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
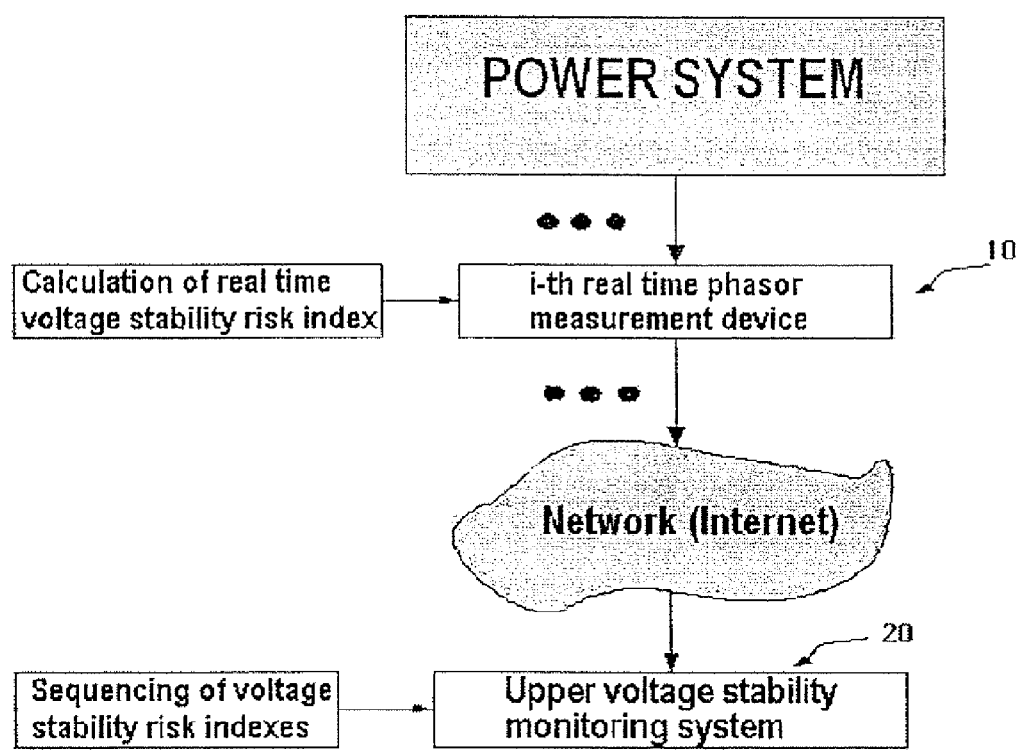
FIG. 1 is a schematic diagram illustrating a method of calculating a voltage stability risk index according to the present invention.
Figure 2:
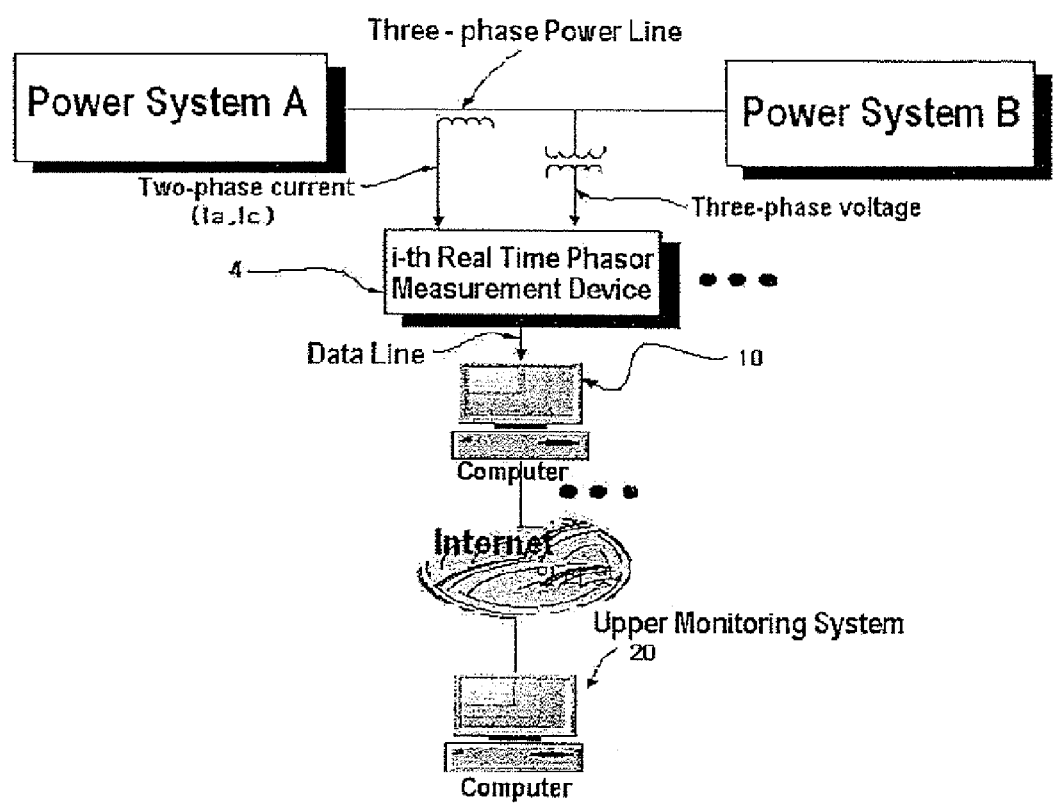
FIG. 2 is a schematic diagram illustrating a system of calculating a voltage stability risk index according to the present invention.

FIG. 1 is a schematic diagram illustrating a method of calculating a voltage stability risk index according to the present invention. FIG. 2 is a schematic diagram illustrating a system of calculating a voltage stability risk index according to the present invention. By employing a real time phasor measurement device 10 as shown in FIGS. 1 and 2, the problem related to data required in voltage stability analysis using a conventional power flow calculation can be solved. The real time phasor measurement device 10 measures voltage from a power system, calculates a root mean square (RMS) value of the voltage and then voltage stability risk index, and transfer the data calculated into Internet or a communication equipment. By analyzing time series bus voltages measured by using the phasor measurement device 10 installed on each main bus, the method of calculating voltage stability risk index according to the present invention doesn't need to construct the data on electric power amounts and load amounts for the whole buses as in the conventional method using a power flow calculation. The system and the method according to the present invention can fully reflect system characteristics because it directly analyzes the time series data measured, thereby performing the correct monitoring of voltage stability.

Figure 3:
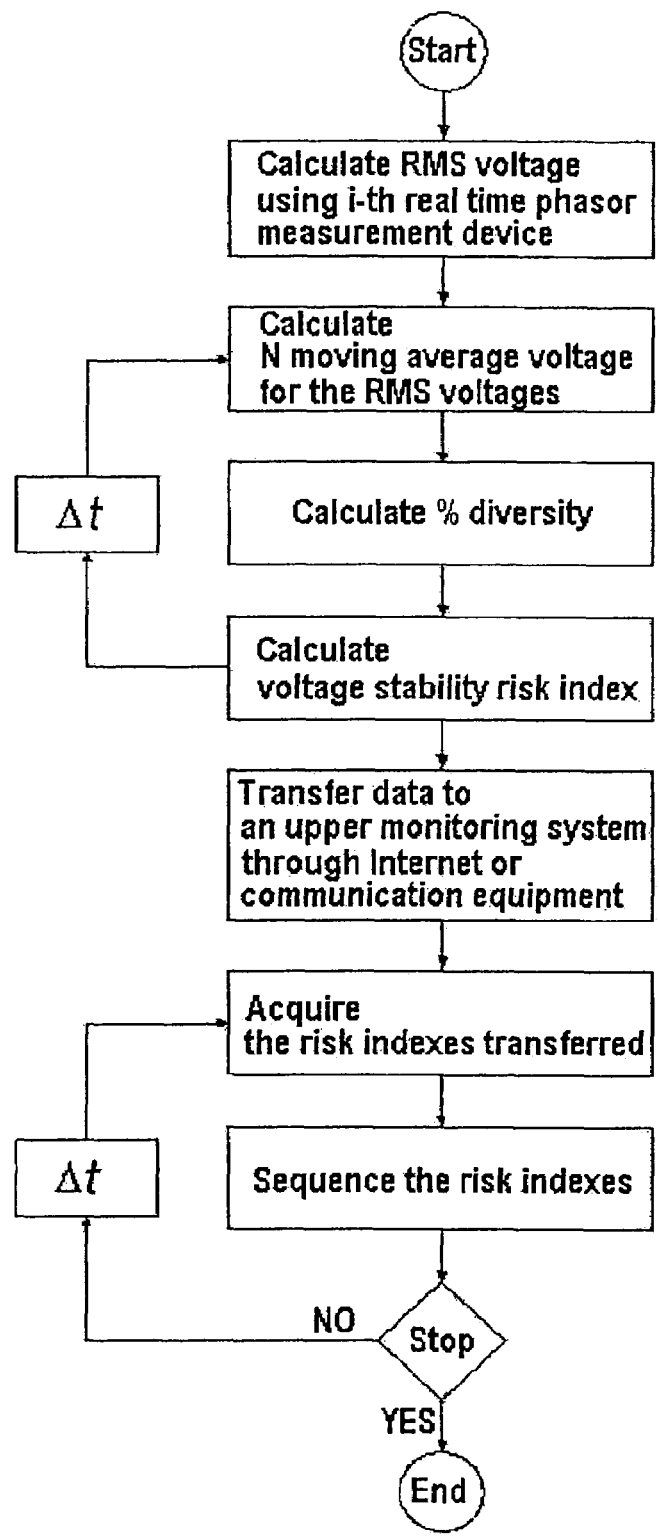
FIG. 3 is a flow chart illustrating an algorithm of calculating a voltage stability risk index according to the present invention.

FIG. 3 is a flow chart illustrating an algorithm of calculating a voltage stability risk index according to the present invention. Referring to FIG. 3, to monitor the voltage stability of a main bus in real time, the real time phasor measurement device 10 installed on each main bus calculates a voltage stability risk index and transfers it to an upper voltage stability monitoring system 20. Then, the upper voltage stability monitoring system 20 collects and sequences the voltage stability risk indexes transferred. This process is performed within several seconds based on the performance of the real time phasor measurement device 10 or a data transfer rate. Therefore, the voltage stability of main buses can be monitored in real time.

A method of calculating a real time voltage stability risk index according to the present invention is now described in detail.

The first step is to measure the voltage of a bus. A real time phasor measurement device 10 measures instantaneous voltages of a bus and calculates a RMS voltage using the instantaneous voltages measured per 8 msec to 40 msec. The RMS voltage values calculated in real time are stored to be used for a next step.

The second step is to calculate an N moving average voltage ($v_j$). First, input data, $y_i$, i=1,2,3, . . . , M, are transformed into a vector $y=[y_1, y_2, \ldots, y_M]^T$. An N moving average voltage ($v_j$) is calculated by considering two conditions.

In case of $j \leq N$, $v_j$ is initialized by the equation (1).

$$v_j = \frac{\sum_{i=1}^{j} y_i}{j}, \quad j = 1, 2, \ldots, N \tag{1}$$

In case of $j > N$, an N moving average voltage ($v_j$) is calculated by the equation (2).

$$v_j = \frac{\sum_{i=j-N+1}^{j} y_i}{N} = v_{j-1} + \frac{y_i - y_{i-N}}{N}, \quad j = N+1, \ldots, M \tag{2}$$

The third step is to compute % diversity ($d_i$). The % diversity indicates a difference between an i-th data measured, $y_i$, and a moving average value, $v_i$, and represents instantaneous voltage sensitivity. The % diversity ($d_i$) is calculated by the following equation (3).

$$d_i = \frac{y_i - v_i}{v_i} \times 100, \quad i = 1, 2, \Lambda, M \tag{3}$$

The fourth step is to calculate a voltage stability risk index ($z_j$). The area constructed by the % diversity may indicate the soundness of a bus voltage. A voltage stability risk index is calculated by dividing the area constructed by the % diversity, which comprises N sections, by N. The smaller the area constituted by the % diversity is, the more robust the bus voltage is. On the contrary, as the area constituted by the % diversity increases, the stability of the bus voltage reduces. The voltage stability risk index ($z_j$) is calculated using a trapezoidal integral rule by considering two conditions.

In case of $j \leq N$, $z_j$ is initialized by the equation (4).

$$z_j = \frac{1}{j}\left[\frac{\sum_{i=1}^{j}(d_i + d_{i-1})\Delta t}{2}\right], \quad d_0 = 0, \Delta t = 1, j = 1, 2, \Lambda, N \tag{4}$$

Here, it is assumed that $\Delta t$ is a sampling period.

In case of $j > N$, a voltage stability risk index, $z_j$, is calculated by the following equation (5).

$$z_j = \frac{1}{N}\left[\frac{\sum_{i=j-N+1}^{j}(d_i + d_{i-1})\Delta t}{2}\right]$$
$$= z_{j-1} + \frac{1}{N}\left[\frac{(d_j + d_{j-1}) - (d_{j-N} + d_{j-1-N})\Delta t}{2}\right]$$
$$\Delta t = 1, j = N+1, \Lambda, M \tag{5}$$

The fifth step is to transfer the voltage stability risk index calculated at the above-mentioned step. The voltage stability risk index is transferred into an upper voltage stability monitoring system 20 through Internet or a communication equipment.

The sixth step is to acquire the voltage stability risk index transferred. The upper voltage stability monitoring system 20 acquires the voltage stability risk index transferred from the real time phasor measurement device 10 by the period of $\Delta t$.

The seventh step is to sequence the voltage stability risk indexes. The voltage stability risk indexes, which are transferred from the real time phasor measurement devices 10, are transformed into a vector $z=[z_1, z_2, \ldots, z_k]^T$ at the upper voltage stability monitoring system 20. The risk index vector is sequenced according to the magnitude of each voltage stability risk index. The bus with the largest positive risk index has the risk of an overvoltage. The bus with the smallest negative risk index has the risk of a low-voltage.

An example process of calculating a voltage stability risk index according to the present invention is now described.

[First Step]
Input data vector: y=[2, 4, 6, 8, 10]
Moving average: N=4
The number of data: M=5
$\Delta t=1$

[Second Step]
N moving average calculated by using equations (1) and (2):

$v_1=2/1, v_2=(2+4)/2, v_3=(2+4+6)/3, v_4=(2+4+6+8)/4, v_5=(4+6+8+10)/4$

N moving average vector: v=[2, 3, 4, 5, 7]

[Third Step]
% diversity calculated by using equation (3): d=[0, 33.0, 50.0, 60.0, 42.9]

[Fourth Step]
A risk index calculated by using equations (4) and (5):

$z_1=0.0, z_2=33/4=8.25, z_3=(0+33+83)/6=19.33, z_4=(0+33+83+110)/8=28.25, z_5=(33+83+110+102.9)/8=41.11$

Risk index vector: z=[0, 8.25, 19.33, 28.25, 41.11]

The data analysis according to the present invention can quantify voltage stability into a risk index in real time at a transient state. Such a time series data analysis has been successfully applied to a real time stock price analysis in the stock market and may be also applied to a voltage stability analysis in a power system.

The real time phasor device performs voltage sampling more than 60 times per a second, calculates an RMS voltage using the voltages sampled, and stores the data calculated. A high performance phasor device can calculate a risk index and transfer the same into an upper voltage stability monitoring system per several seconds through Internet or a communication equipment. The upper voltage stability monitoring system 20 collects and sequences the risk indexes transferred from main buses. Through the sequencing of the risk indexes, the bus with the lowest order is determined as a bus with the highest voltage stability risk. Thus, the method according to the present invention can monitor the bus vulnerable to voltage stability in real time.

Figure 4:
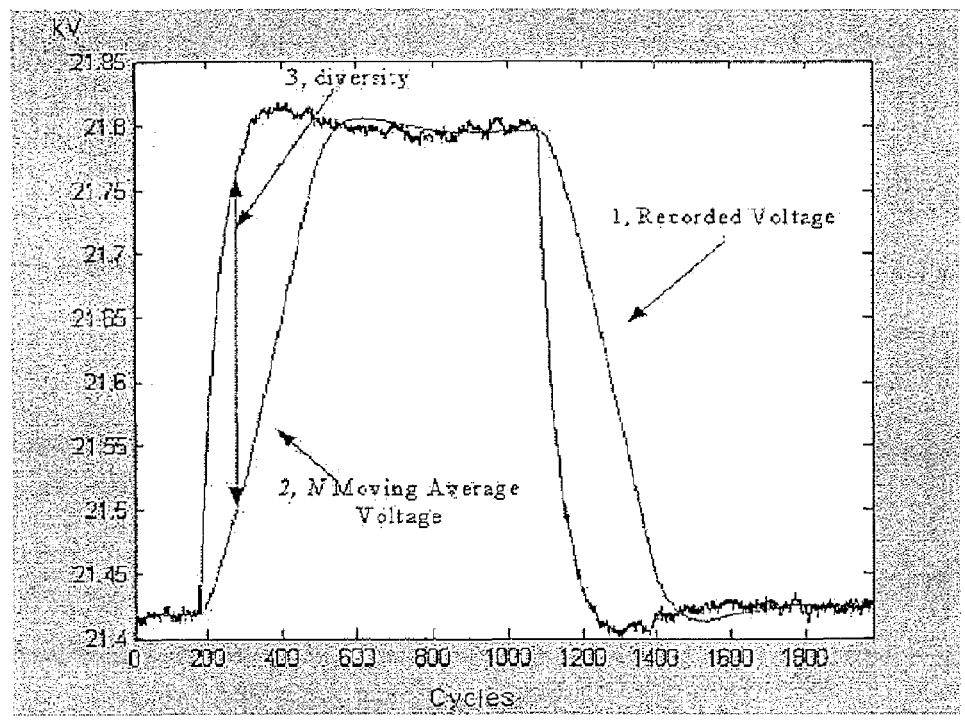
FIG. 4 is a graph illustrating bus voltage data measured and N moving average voltage according to the present invention.

FIG. 4 is a graph illustrating bus voltage data and N moving average voltage according to the present invention. The RMS voltages are calculated and stored by a digital phasor measurement device. The phasor measurement device measures instantaneous voltages at the frequency of 240 Hz and calculates 60 RMS voltages per a second using the voltages measured. Here, the number of the moving average N is 300. The stored RMS voltages may be used to compute a moving average.

Figure 5:
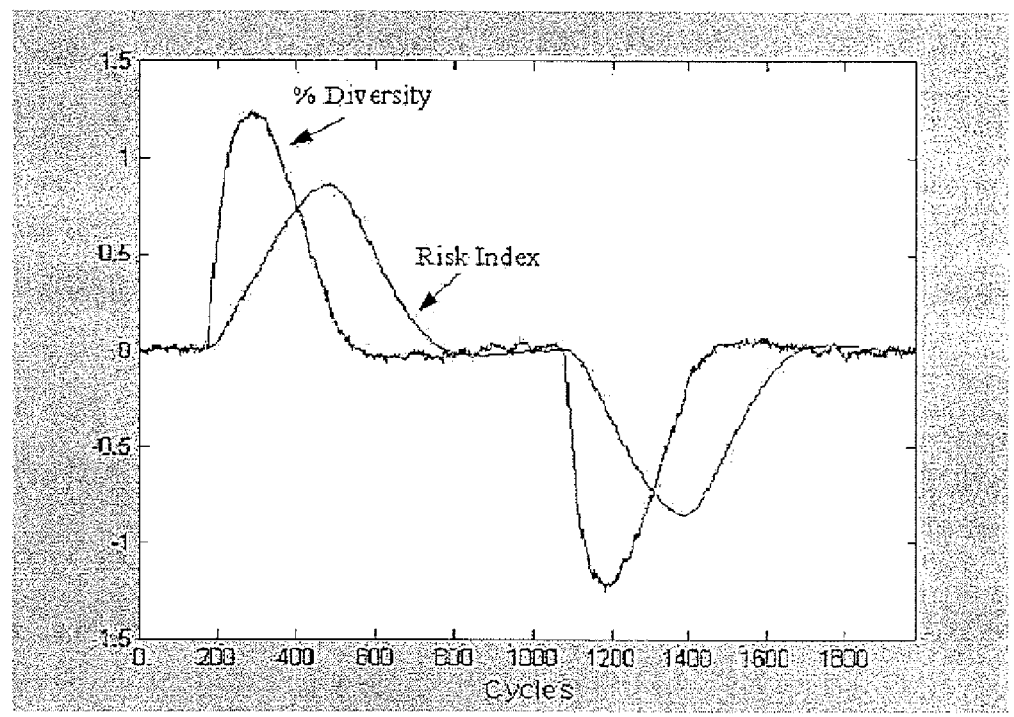
FIG. 5 is a graph illustrating a % diversity of FIG. 4 and a voltage stability risk index.

FIG. 5 is a graph illustrating % diversity and voltage stability risk index for FIG. 4. FIGS. 4 and 5 show the analysis of voltages measured at just one bus. The system according to the present invention is more effective for a multi-bus system.

Figure 6:
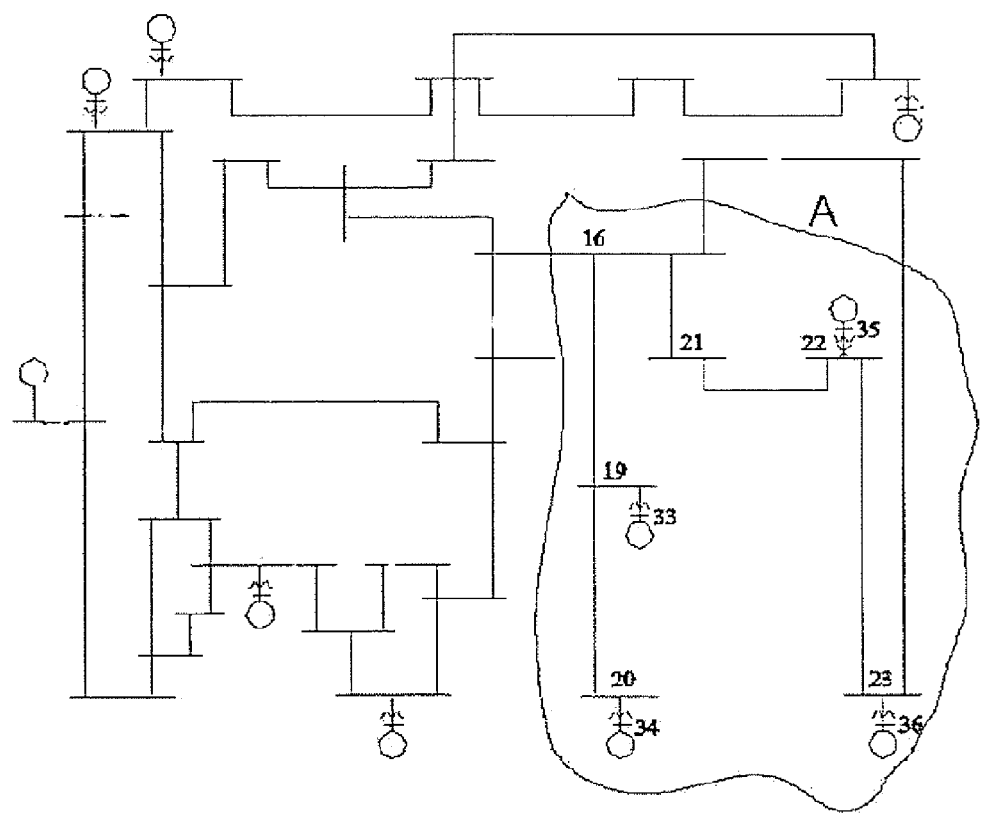
FIG. 6 is a schematic diagram illustrating an example of England 39 bus system.
Figure 7:
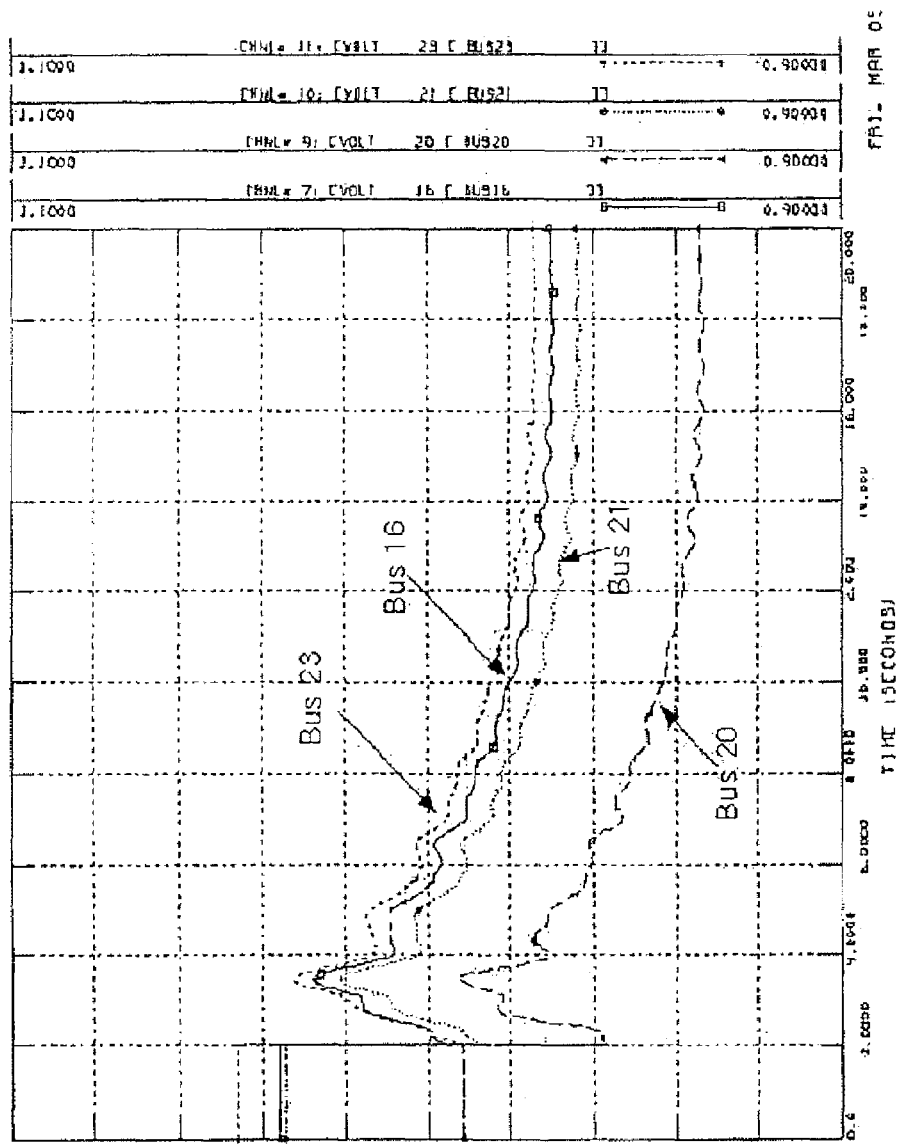
FIG. 7 is a graph illustrating the voltage responses of load buses in an A area when a trip accident has occurred in a generator bus.
Figure 8:
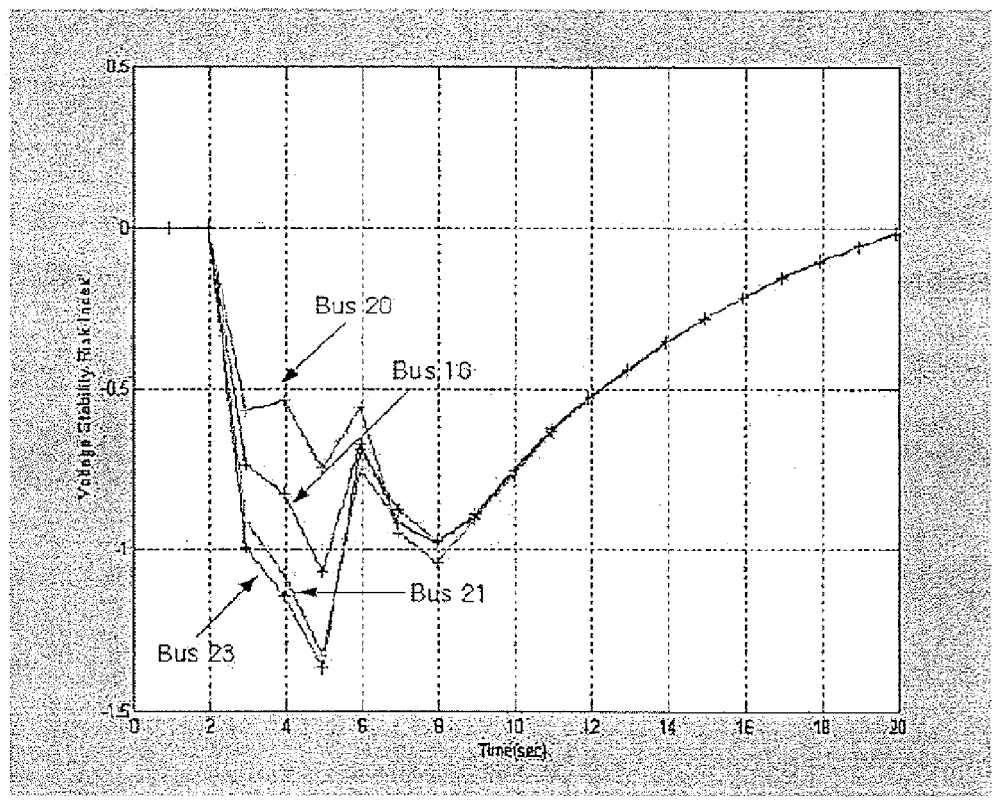
FIG. 8 is a graph illustrating voltage stability risk indexes analyzed for FIG. 7.

FIG. 6 is a schematic diagram illustrating an England 39 bus system. FIG. 7 is a graph illustrating voltage responses of load buses in an A area during a trip accident at a generator bus. FIG. 8 is a graph illustrating a voltage stability risk index analysis for FIG. 7. To verify the applicability of the suggested risk index calculation system to a multi-bus power system, a 10-generator 39-bus system as shown in FIG. 6 is assumed and simulated. An assumed accident is that a generator bus 35 in the A area is suddenly tripped. The network data and generator data on the system were abstracted from *Small signal stability analysis program package: version* 3.0, Volume 1, EPRI TR-101850, February 1993. This system is inherently vulnerable to small signal stability. However, in order to observe only voltage stability, an excitation system and a governor/turbine system have been slightly modified. The excitation system comprises a static exciter, a power system stabilizer (PSS) controller, and a field voltage limiter. The governor/turbine system is assumed as a thermal power generator model. Simulation is performed using a commercial transient stability program, an RMS analysis program.

FIG. 7 illustrates voltage response characteristics of main load buses in the A area when a trip accident occurs in the generator bus 35. In FIG. 7, the data comprises 60 RMS voltages per second. FIG. 8 is a graph illustrating voltage stability risk indexes of main load buses shown in FIG. 7 when the data is analyzed at the condition of N=180 and risk indexes are transferred into an upper voltage stability monitoring system per second ($\Delta t=1$).

Before the occurrence of trip accident, the operation condition of the load buses in the A area is illustrated in Table 1. As shown in Table 1, the bus 20 has the lowest voltage.

TABLE 1

| Bus | Load (MW + jMVar) | Voltage (p. u.) |
|---|---|---|
| 16 | 329.4 + j32.3 | 1.035 |
| 20 | 680.0 + j103.0 | 0.9915 |
| 21 | 274.0 + j115.0 | 1.034 |
| 23 | 247.0 + j84.0 | 1.046 |

FIG. 7 provides only limited amount of information. However, the method according to the present invention can easily find the bus vulnerable to transient voltage stability by analyzing the risk indexes calculated by the algorithm according to the present invention. As shown in FIG. 8, after the generator bus 35 is tripped, the most vulnerable bus to transient voltage stability is a bus 23 and, next, a bus 21. The bus 20 has the lowest voltage but is less sensitive in terms of voltage sensitivity than other buses. Such a result indicates that the bus vulnerable to transient voltage stability is more greatly influenced by rather the operation condition of an adjacent reactive power source at the time of an accident than a bus operation voltage before the accident. In FIG. 8, the risk indexes of the load buses converge into zero to stabilize the bus voltages.

From the foregoing, persons of ordinary skill in the art will appreciate that, by analyzing voltage stability risk indexes calculated by the disclosed system and method in real time, a power system operator can promptly deal with disturbances to properly control system voltage. From the foregoing, persons of ordinary skill in the art will further appreciate that the disclosed system and method can monitor the voltage stability in a transient state in real time and, therefore, a power system operator can cope with a rapid voltage collapse, thereby preventing a power failure.

It is noted that this patent claims priority from Korean Patent Application Serial Number 10-2004-0032878, which was filed on May 11, 2004, and is hereby incorporated by reference in its entirety.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A system for calculating a real time voltage stability risk index in a power system, the system comprising:
   a real time phasor measurement device for measuring a bus voltage from a power system, calculating a voltage stability risk index from percent diversity between the bus voltage measured and an N moving average voltage for the RMS voltages of the bus voltage measured and transferring the voltage stability risk index; and
   an upper voltage stability monitoring system for collecting and sorting the order of the voltage stability risk index transferred from the real time phasor measurement device based on a magnitude of the voltage stability risk index, and for outputting the sorted voltage stability risk index.

2. A system as defined by claim 1, wherein the real time phasor measurement device transfers the data calculated by using Internet or a communication equipment.

3. A system as defined by claim 1, wherein the real time phasor measurement device is installed on each main bus.

4. The system according to claim 1, wherein the percent diversity between the bus voltage measured and an N moving average voltage for the RMS voltages is calculated by the following equation, $$d_i = \frac{y_i - v_i}{v_i} \times 100, \quad i = 1, 2, \ldots, M$$

where $d_i$ represents the diversity, $y_i$ represents the data measured and $v_i$ represents the moving average value.

5. A method for calculating a real time voltage stability risk index in a power system, the method comprising:
   calculating and storing RMS voltage by using a measured bus voltage;
   calculating an N moving average voltage for the RMS voltages;
   calculating a percent diversity between the bus voltage measured and the N moving average voltage, the percent diversity ($d_i$) being calculated by the following equation, $$d_i = \frac{y_i - v_i}{v_i} \times 100, \quad i = 1, 2, \ldots, M$$

where $d_i$ represents the diversity, $y_i$ represents the data measured and $v_i$ represents the movinit averaae value;
   calculating a voltage stability risk index by dividing the area constructed by the percent diversity by the number of sections;
   transferring the voltage stability risk index from a real time phasor measurement device to an upper voltage stability monitoring system through the Internet or a communication equipment;
   acquiring the voltage stability risk indexes transferred from the real time phasor measurement device;
   sorting the order of the acquired voltage stability risk indexes based on the magnitude of the voltage stability risk indexes; and
   outputting the sorted voltage stability risk indexes.

6. A method as defined by claim 5, wherein calculating RMS voltages is performed by using instantaneous voltages measured per 8 msec to 40 msec.

7. A method as defined by claim 5, wherein calculating an N moving average voltage is performed by using the following equation, $$v_j = \frac{\sum_{i=1}^{j} y_i}{j}, \quad j = 1, 2, \ldots, N, \text{ in case of } j \leq N.$$

8. A method as defined by claim 5, wherein calculating an N moving average voltage is performed by using the following equation, $$v_j = \frac{\sum_{i=j-N+1}^{j} y_i}{N} = v_{j-1} + \frac{y_i - y_{i-N}}{N}, \quad j = N+1, \ldots, M \text{ in case of } j > N.$$

9. A method as defined by claim 5, wherein calculating a voltage stability risk index is performed by using the following equation, $$z_j = \frac{1}{j}\left[\frac{\sum_{i=1}^{j}(d_i + d_{i-1})\Delta t}{2}\right], \quad d_0 = 0, \Delta t = 1, j = 1, 2, \Lambda, N \text{ in case of } j \leq N.$$

10. A method as defined by claim 5, wherein calculating a voltage stability risk index is performed by using the following equation, $$z_j = \frac{1}{N}\left[\frac{\sum_{i=j-N+1}^{j}(d_i + d_{i-1})\Delta t}{2}\right] = z_{j-1} + \frac{1}{N}\left[\frac{(d_j + d_{j-1}) - (d_{j-N} + d_{j-1-N})\Delta t}{2}\right]$$

$\Delta t = 1$, $j = N+1 \ldots, M$
in case of $j > N$.

11. A method as defined by claim 5, wherein acquiring the voltage stability risk index transferred from the real time phasor measurement device is performed by the period of $\Delta t$.

* * * * *

UNITED STATES PATENT AND TRADEMARK OFFICE
CERTIFICATE OF CORRECTION

PATENT NO. : 7,236,898 B2
APPLICATION NO. : 11/113048
DATED : June 26, 2007
INVENTOR(S) : Kim et al.

It is certified that error appears in the above-identified patent and that said Letters Patent is hereby corrected as shown below:

At column 8, line 2 of the printed patent, "the movinit averaae value" should be --the moving average value--

At column 8, line 46 of the printed patent, "= 1, 1, $\Lambda$, N" should be --= 1, 2, …, N--

Signed and Sealed this

Third Day of June, 2008

JON W. DUDAS
*Director of the United States Patent and Trademark Office*